United States Patent [19]

Lorincz

[11] Patent Number: 5,048,788
[45] Date of Patent: Sep. 17, 1991

[54] HANGING DEVICE FOR HARDBOARD
[75] Inventor: Eugene M. Lorincz, Cinnaminson, N.J.
[73] Assignee: Moore Push-Pin Company, Wyndmoor, Pa.
[21] Appl. No.: 401,663
[22] Filed: Aug. 31, 1989

Related U.S. Application Data

[63] Continuation-in-part of Ser. No. 221,764, Jul. 20, 1988, abandoned.

[51] Int. Cl.$^5$ .............................................. A47G 1/00
[52] U.S. Cl. .................................... 248/477; 248/496; 248/546; 248/497
[58] Field of Search ............... 248/477, 489, 496, 547, 248/546, 300, 301, 498, 497, 466; 411/907, 908

[56] References Cited

U.S. PATENT DOCUMENTS

| | | |
|---|---|---|
| D. 203,538 | 1/1966 | DiNuccio . |
| D. 208,580 | 9/1967 | Margulis . |
| D. 227,976 | 7/1973 | Barth . |
| D. 241,711 | 10/1976 | Wallace . |
| D. 282,525 | 2/1986 | Samson . |
| 417,313 | 12/1889 | De Haven . |
| 769,794 | 9/1904 | Fowler .......................... 248/489 |
| 814,163 | 3/1906 | Pursell . |
| 961,616 | 6/1910 | Johnson ..................... 248/489 X |
| 999,961 | 8/1911 | Colas .......................... 248/496 |
| 1,223,802 | 4/1917 | Kuhn . |
| 1,297,584 | 3/1919 | Mock . |
| 1,297,611 | 3/1919 | Upson . |
| 1,328,201 | 1/1920 | Rendano . |
| 1,600,919 | 9/1926 | Baalsrud . |
| 1,616,957 | 2/1927 | Honigbaum . |
| 1,729,721 | 10/1929 | Hogan .......................... 248/498 |
| 1,914,951 | 6/1933 | Kiessling . |
| 1,999,575 | 4/1935 | Reuter . |
| 2,055,442 | 9/1936 | Jones .......................... 411/457 |
| 2,339,841 | 1/1944 | Deuchler . |
| 2,448,137 | 8/1948 | Cody . |
| 2,483,114 | 9/1949 | Van Schoor .................. 248/496 |
| 2,606,730 | 8/1952 | Bryn . |
| 2,635,840 | 4/1953 | Barry . |
| 2,709,055 | 5/1955 | Harty . |
| 2,757,890 | 8/1956 | Sutton . |
| 2,877,972 | 3/1959 | Sutton . |
| 2,940,712 | 6/1960 | Lloyd-Young . |
| 3,031,159 | 4/1962 | Waller . |
| 3,298,651 | 1/1967 | Passer . |
| 3,322,018 | 5/1967 | Moehlenpah . |
| 3,447,823 | 6/1969 | Gregoire . |
| 3,556,459 | 1/1971 | Summerville . |
| 3,638,892 | 2/1972 | Boye . |
| 3,966,157 | 6/1976 | Corral . |
| 4,300,745 | 11/1981 | Peterson . |
| 4,420,138 | 12/1983 | Sobel . |
| 4,458,873 | 7/1984 | Sutherland . |
| 4,509,713 | 4/1985 | Hogg . |
| 4,515,338 | 5/1985 | Schneider .................... 248/496 X |
| 4,728,237 | 3/1988 | Lorincz . |
| 4,775,129 | 10/1988 | Gleisten ...................... 248/496 X |

OTHER PUBLICATIONS

Moore Push-Pin Co.—brochure (1980).
Figra—brochure—date unknown.

*Primary Examiner*—Karen J. Chotkowski
*Attorney, Agent, or Firm*—William H. Eilberg

[57] ABSTRACT

A hanging device for a hardboard member, such as a hardboard-backed picture, includes pairs of prongs which grip the hardboard, and a saw-tooth structure with which the hanging device can be suspended from a nail or similar article. The prongs of each pair are angled towards each other so that they bite into the hardboard when inserted. The hanging device is preferably formed from an initially flat piece of metal. A first portion of the hanging device includes one or more openings containing the prongs and a second portion defines an opening having the sawtooth structure. In an alternative embodiment, the second portion also includes prongs, and in this embodiment, there are three sets of prongs for engaging the hardboard. After the hanging device has been driven into the hardboard, the second portion is bent away from the hardboard, so that the hanging device can be suspended from a nail or picture hanger affixed to a wall. The sawtooth structure can be combined with a plurality of protrusions which permit the hanging device to be suspended from either a nail or a conventional picture hanger, without modification.

11 Claims, 2 Drawing Sheets

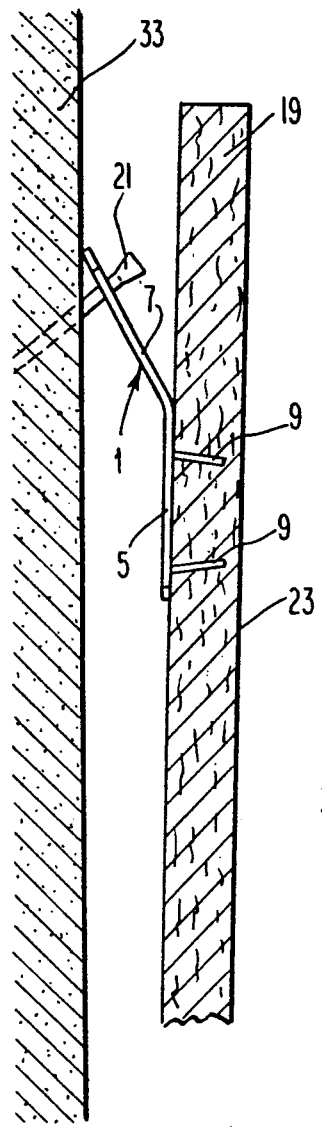
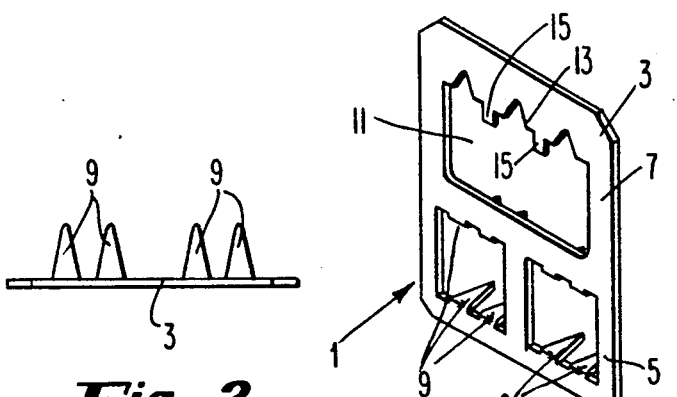
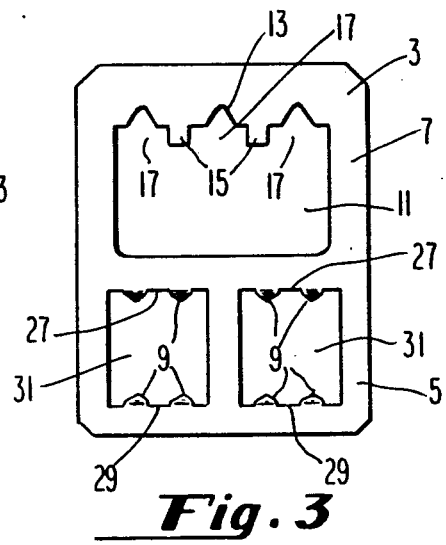
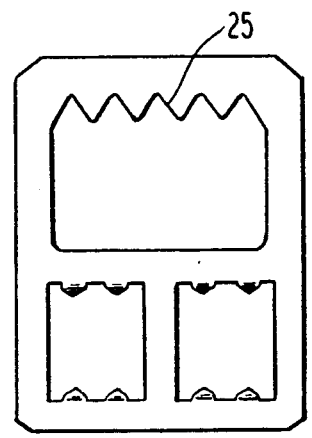

HANGING DEVICE FOR HARDBOARD

CROSS-REFERENCE TO PRIOR APPLICATION

This is a Continuation-in-Part of U.S. patent application Ser. No. 07/221,764, filed July 20, 1988, and now abandoned entitled "Hanging Device for Hardboard".

BACKGROUND OF THE INVENTION

This invention relates to the field of picture hanging devices, and, in particular, to devices used for suspending hardboard-backed pictures from a wall.

Devices for hanging pictures have been known for a long time. Examples of such devices which include prongs inserted into a wall are shown in U.S. Pat. Nos. 1,914,951, 3,556,459, 1,600,919, 1,223,802, 2,606,730, 1,999,575, 2,448,137, 3,966,157. Other fastening devices having prongs are shown in U.S. Pat. Nos. 2,339,841 and 1,297,611.

Pictures have been traditionally framed by encasing the picture between a layer of glass and a layer of cardboard or other relatively soft material. The frame fits around the glass, the picture, and the cardboard, and includes means for supporting a wire which can then be strung over a nail or picture hanger. In this arrangement, the glass accounts for most of the weight of the entire structure. The glass imparts stability to the picture, reducing the likelihood that the framed picture will move while hanging from a wall.

Because glass has become increasingly expensive in recent years, it has become economically preferable to replace it with a clear plastic material. The disadvantage of plastic, however, is that it weighs much less than glass. Thus, a framed picture encased within a layer of clear plastic and a layer of cardboard is much lighter than the comparable combination including glass, and does not enjoy the stability of a conventional framed picture having a glass cover.

One way to overcome the above-described stability problem is to replace the cardboard backing with a relatively heavy material, such as hardboard. The hardboard is typically of the type sold under the trademark "Masonite" (the trademark being owned by the Masonite Corporation). Tempered hardboard, which is more rigid than ordinary hardboard, is especially desirable for this purpose. The picture is now sandwiched between a piece of hardboard, which is usually one-eighth of an inch thick, and a thin layer of clear plastic. A frame is fitted around the above-described elements. The frame may be a plastic frame which is formed in two L-shaped pieces, and which fits around the picture. The frame could also be made of wood or other materials. The frame defines, or is connected to, means for holding a picture wire. With this arrangement, most of the weight of the picture is concentrated in the hardboard backing instead of in a glass covering for the picture.

The hardboard backed picture described above has the advantage of avoiding the need for glass, while still providing the stability of a framed picture containing glass. But it is still difficult to mount the picture to the wall with the devices of the prior art. Because the hardboard is usually only one-eighth of an inch thick, it is not advisable to drive nails or prongs into the hardboard, because the nails or prongs might pierce the hardboard and the picture. Thus, the picture can be reliably hung only if there is a structure built into the frame, as described above, for holding a picture wire. Where there is no frame, such as in the case of a hardboard-mounted plaque, there is no convenient way of mounting the hardboard except with a nail-like hanging device.

One therefore needs a hanging device that can grasp or bite into a hardboard adequately, and which does not pass all the way through the hardboard so as to damage the picture or create an uneven surface behind the picture. The pronged hanging devices of the prior art resemble nails. They tend to be so long that they pierce the entire thickness of the hardboard. One might try to solve the problem by simply reducing the length of prongs, but this is not a satisfactory solution because short and stubby prongs cannot readily grasp or bite the hardboard as desired. In other words, the prong must be short enough to operate safely, and must be long enough to allow the formation of a fully-developed point.

The present invention provides a hanging device which is especially suited for attaching hardboard-backed pictures to a wall. The hanging device of the invention does not mar the front surface of the hardboard, but it still grasps the hardboard with considerable strength, and allows a heavy picture to be mounted reliably from a nail or a conventional picture hanger.

SUMMARY OF THE INVENTION

In one embodiment, the hanging device of the present invention has two portions, the first portion containing the prongs and the second portion defining a sawtooth structure for suspending the hanging device from a nail or conventional hanger. The device is preferably made from a blank of thin metal which is die-cut to form openings in which the prongs and sawtooth pattern are located.

The prongs are preferably formed in pairs, and the prongs of each pair are angled towards each other. The prongs are therefore non-perpendicular to the body. The acute angle formed by the prongs with the body is preferably about 80°. When the device is inserted into the hardboard, the prongs of each pair tend to remain angled towards each other, and tend to grab the hardboard. In this embodiment, it is preferred that the acute angles between all of the prongs and the body be substantially equal.

The sawtooth structure, formed on the second portion of the hanging device, can be a conventional sawtooth pattern, enabling the device to hang from an ordinary nail, or it can have a modified structure, which combines the sawtooth pattern with a plurality of protrusions. The protrusions define generally rectangular channels which can receive the similarly shaped body of a conventional picture hanger. Thus, the hanging device can be used to suspend a picture from a nail or from a conventional picture hanger, without modification of the device.

The hanging device is inserted into the hardboard with a hammer or similar tool. Then, the second portion of the device is bent away from the hardboard. Bending the second portion allows a nail or conventional hanger to be inserted through the opening of the second portion of the device. Thus, the hanging device is removably attachable to a hanger affixed to a wall or other surface.

In an alternative embodiment, both the first and second portions of the hanging device contain prongs. In this embodiment, there are three sets of prongs which engage the hardboard. The prongs of the first set are angled towards the prongs of the second set, and the prongs of the second set are angled away from the prongs of the third set.

In still another alternative embodiment, the hanging device includes only one generally rectangular portion, with only two sets of prongs, the prongs being angled away from each other.

It is therefore an object of the invention to provide a hanging device which is especially suited for use with a hardboard material.

It is another object to facilitate the replacement of glass with plastic, in the framing of pictures.

It is another object to provide efficient means for mounting a hard-board-backed picture to a wall or other surface.

It is another object to provide a device for hanging a hardboard object from a wall, regardless of whether the hardboard includes a frame.

It is another object to provide a hanging device having prongs which do not mar the front surface of a piece of thin hardboard, and wherein the prongs grasp the hardboard with great strength.

It is another object to provide a hanging device having angled prongs, wherein the angle of the prongs can be precisely controlled.

It is another object to provide a hanging device for a hardboard, wherein the device enables the hardboard to be suspended from either a nail or a conventional picture hanger.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 1 is a perspective view of the hanging device made according to a first embodiment of the present invention.

FIG. 2 is a top view of the hanging device of FIG. 1, showing the position of some of the prongs.

FIG. 3 is a front view of the hanging device of FIG. 1.

FIG. 4 is an end view of the hanging device of FIG. 1, showing the orientation of the prongs.

FIG. 5 is a cross-sectional view of a wall and a hardboard, showing the use of the hanging device of FIG. 1.

FIG. 6 is a front view of an alternative embodiment of the hanging device.

DETAILED DESCRIPTION OF THE INVENTION

Figure 8:
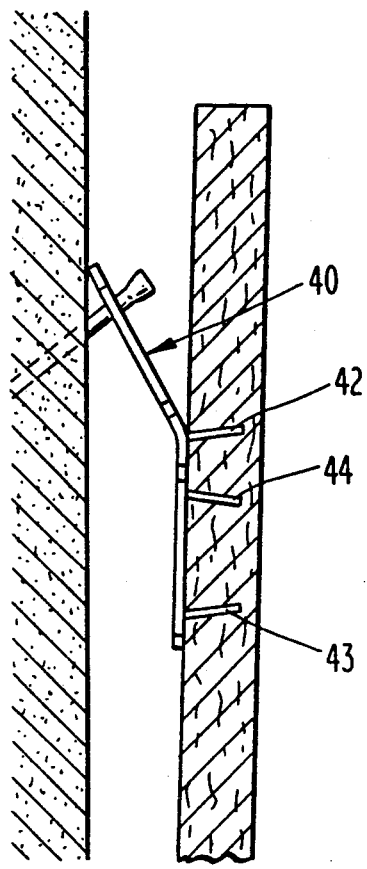
FIG. 8 is a cross-sectional view, similar to that of FIG. 5, showing the use of the hanging device of FIG. 7.

Throughout this specification, the term "hanging device" is used to refer to the device of the present invention. The term "hanger" is used to indicate conventional picture hangers.

FIG. 1 is a perspective view of one embodiment of the hanging device of the present invention. Hanging device 1 includes body 3, having first portion 5 and second portion 7. The first portion contains prongs 9 and the second portion defines opening 11 in which sawtooth pattern 13 is located. The opening allows the sawtooth pattern to engage a nail or conventional picture hanger, when the hanging device is in use.

In the embodiment explicitly shown in both FIGS. 1 and 3, a pattern of protrusions 15 is superimposed on sawtooth pattern 13. The protrusions define generally rectangular channels 17. These rectangular channels are shaped to fit the rectangular portion of a conventional picture hanger (not shown). Thus, the hanging device shown in FIG. 1 or 3 can be suspended from either a nail or a conventional hanger, without modification.

FIGS. 2 and 4 illustrate the shape and position of the prongs. FIG. 2 is a top view, showing the preferred shape of prongs 9 which protrude from body 3 of the hanging device. FIG. 4 is an end view, showing that the prongs are angled with respect to body 3. The acute angle formed by the prongs and the body should be small enough to 'bite' the hardboard, but not so small that it becomes difficult to drive the hanging device into the hardboard. The preferred angle, which represents the best compromise between the above-described considerations, is about 80. However, the exact angle can be varied somewhat, and the value given should not be interpreted to limit the invention.

FIG. 5 shows the hanging device in use. Hanging device 1 is inserted into hardboard 19. Note that prongs 9 remain angled while inserted into the hardboard, and that the prongs do not pierce front surface 23 of the hardboard. Thus, the prongs grab the hardboard, and are very unlikely to be dislodged. Second portion 7 of hanging device 1 is suspended from nail 21 which is affixed to wall 33.

In FIG. 5, hardboard 19 is shown without a picture, and without a plastic cover or frame for the picture. It is understood that the invention can be used with or without the plastic cover or frame. That is, one can mount a picture directly onto the hardboard, without using a frame or a cover. The hanging device operates in the same manner in all cases.

In use, the hanging device is first inserted into the hardboard with a hammer, or similar tool. When the device is hammered into the hardboard, it lies generally flat against the hardboard surface. One then bends back the second portion, i.e. portion 7 shown in FIGS. 1, 3, and 5. Then, one suspends the hardboard from a nail or picture hanger, as shown in FIG. 5. It is also possible to bend the hanging device before inserting it into the hardboard, but it is generally easier to insert the device before bending. The hanging device enables the picture to be easily suspended or removed from the nail or hanger; the hanging device does not become permanently affixed to the wall.

FIG. 6 is a front view of an alternative embodiment of the hanging device of the present invention. The only difference between this embodiment and that shown in FIGS. 1 and 3 is that sawtooth pattern 25 contains no protrusions. All the other features of the device as the same as described above. Thus, the embodiment of FIG. 6 is intended to be suspended from a nail only, and not from a conventional picture hanger. Since FIGS. 2, 4, and 5 do not show the structure of the sawtooth pattern, the hanging devices of these figures could be of either of the above-described embodiments.

In all of the embodiments described above, the prongs are formed in pairs, and the prongs of each pair are angled towards each other. When the prongs are angled, they grasp or 'bite' the hardboard more firmly than they would if they were not angled. Indeed, if the prongs were not angled, i.e. if they were perpendicular to the body of the hanging device, they would behave as ordinary nails. The angled structure also makes it possible to make the prong longer than would be possible if the prong were inserted perpendicularly, while still preventing the prong from passing all the way through the hardboard. It is preferred that the fastener include more than one pair of prongs, as shown, so that if one prong is accidentally bent at the wrong angle, there will be other prongs to accomplish the desired effect.

It is preferred that the prongs be oriented, on the first portion of the body, such that they point generally upwards and downwards when the hanging device is in use. That is, the prongs should be formed on upper side 27 and lower side 29 of opening 31 of the hanging device, and not on the other sides of the opening. When the prongs are located in this way, the weight of the framed picture, or other object, tends to help to hold the prongs in the hardboard. By contrast, if the prongs were located on the other sides of opening 31, so that they were generally horizontally disposed when in use, the weight of the picture could tend to force the prong out of the hardboard.

Hanging device 1 is constructed with openings 31 for the purpose of precisely controlling the angle of the prongs. If openings 31 were not present, it would be necessary to form the prongs with a lance punch, urged against a die which defines the desired angle of the prongs. However, a lance punch does not reliably form a prong at a desired angle. As the blade becomes dull, the angle of the prongs tends to change. The prongs mat even become more nearly perpendicular to the body of the hanging device, and this condition is undesirable for the reasons given above.

The preferred method of making the hanging device of the present invention begins by forming openings 31 with a suitable punch apparatus (not shown). Thus, the prongs are initially tongues of metal, integral with the body of the hanging device, and extending into the openings. Then, one uses a forming punch (not shown) to urge these tongues against a suitable die to form prongs oriented at the desired angle. The die (not shown) has a surface which makes the desired angle (such as 80 ) with the body of the hanging device. It is found that when the prongs are formed in this manner, after the openings 31 have been made, the angle of the prongs is precisely controllable, and the resulting product is more efficient. Precise control of the prongs makes it possible to use the hanging device with many different kinds of thin materials, because it is unlikely that the prongs will accidentally pass through the entire thickness of the hardboard material.

Although the prongs are shown as flat projections of metal, they can also be formed into a curved shape, and need not be perfectly straight, provided that they are still properly angled to bite the hardboard. This variation should be considered within the scope of the invention.

It is also possible to use an odd number of prongs, provided that some face upwards and some face downwards. For example, one could arrange range the prongs in groups of three, each group including two prongs facing up and one prong facing down.

Regardless of whether the number of prongs is odd or even, the prongs need not be positioned directly opposite each other. The prongs must always be angled in the general direction of other prongs, so as to achieve the desired biting effect, but this requirement means only that some prongs extend generally upward and some prongs extend generally downward, as indicated in FIG. 4. It is thus not necessary that the prongs directly face each other.

In FIGS. 1 and 3, only two protrusions 15 are shown, but it is understood that the number of protrusions can be varied. In general, the width of the hanging device can be increased, especially for use in hanging very heavy pictures. If the hanging device is made wider, there would be additional prongs and, if the embodiment with protrusions is used, additional protrusions. The spacing of the protrusions would still be chosen to accommodate conventional picture hangers.

Figure 7:
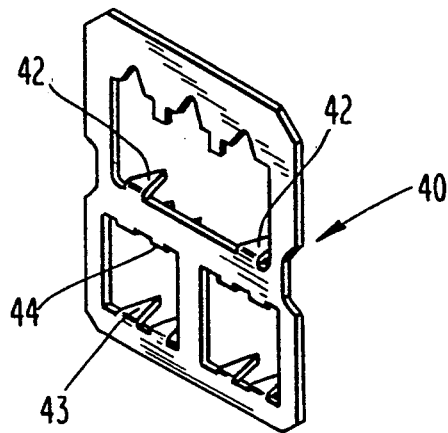
FIG. 7 is a perspective view of a hanging device made according to another alternative embodiment of the invention, wherein there are prongs in both the first and second portions of the device.

FIG. 7 is a perspective view of a hanging device made according to another alternative embodiment of the invention. Hanging device 40 is similar to hanging device 1 of FIG. 1, except that device 40 has prongs 42 in the second portion as well as the first. FIG. 8 shows the use of the hanging device of FIG. 7. All three sets of prongs 42, 43, and 44 are visible in FIG. 8. As shown in FIG. 8, adjacent sets of prongs 43 and 44 are angled towards each other, and adjacent sets of prongs 42 and 44 are angled away from each other. Prongs 42 and 43 are shown as approximately parallel to each other, but it is not necessary that they be exactly parallel.

In the embodiment of FIG. 7, there are only two prongs 42 in the second portion of the hanging device, while there are four prongs 43 and four prongs 44 in the first portion. The number of prongs at each location can be varied. However, if the number of prongs in a set is increased, it is desirable to reduce the angle of inclination, relative to the horizontal, of the prongs in that set. For example, suppose that there are four prongs 43, and two prongs 42. If the prongs 42 are inclined at 10° to the horizontal, then the angle made by prongs 43, which prongs are greater in number than prongs 42, should be less than 10°. For example, the prongs 43 could be disposed at an angle of about 5° to the horizontal.

The tightness with which the hanging device grips the hardboard varies directly with the number of prongs. That is, the more prongs, the tighter the grip. Also, the tightness varies with the angle of the prongs; the greater the angle of inclination from the horizontal, the tighter the grip. Thus, when the number of prongs in a set is increased, it is preferable to compensate by reducing the angle of inclination of the prongs of that set, and conversely. It is desirable to compensate in this manner so that each set of prongs grips the hardboard with approximately equal tightness, regardless of the number of prongs in the set.

The angles given above, and their ratios, are not believed critical; what is important is that the angle made by a given set of prongs, relative to the horizontal, should be reduced when the number of prongs in that set is increased, and conversely.

Figure 9:
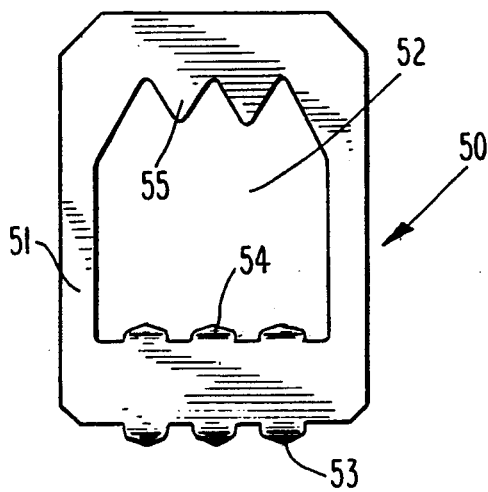
FIG. 9 is a front view of a hanging device made according to another alternative embodiment of the invention.
Figure 10:
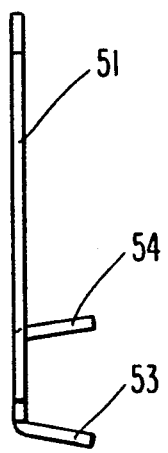
FIG. 10 is a side view of the hanging device of FIG. 9.
Figure 11:
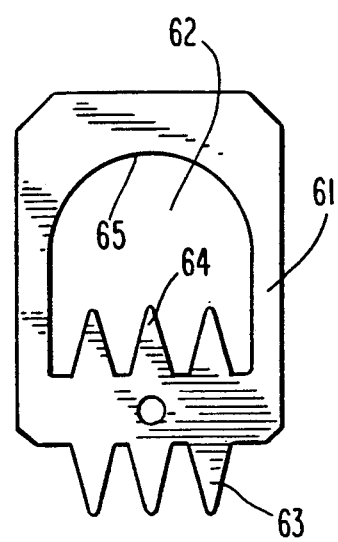
FIG. 11 is a front view of a blank from which one can make the hanging device shown in FIGS. 9 and 10.

FIGS. 9–11 show another alternative embodiment of the hanging device of the present invention. In this embodiment, there is only one opening in the body of the device. Hanging device 50 includes a generally rectangular body 51 defining a generally rectangular opening 52. The body is integrally formed with first prongs 53 and second prongs 54, the first and second prongs being disposed on the interior and exterior edges of one side of the rectangle. The first prongs and the second prongs are angled away from each other, as shown in FIG. 10. Sawtooth pattern 55 is also provided, similar to that shown in FIG. 6, and disposed on the interior edge of the opposite side of the rectangle. The sawtooth pattern can also be replaced with the modified sawtooth pattern shown in FIGS. 1 and 3.

FIG. 11 shows a blank from which one can construct the hanging device of FIGS. 9 and 10. The blank includes body 61, which defines an opening 62. Protrusions 63 and 64 can later be bent to form prongs, similar to those of FIG. 9. Instead of a sawtooth pattern, the blank has a rounded interior surface 65, which, like the sawtooth pattern, can be suspended from a nail or other conventional hanger. The hanging device of FIG. 9 is made from a similar blank.

The embodiments of FIGS. 9-11 have the advantage that they use less material, and are therefore less expensive to manufacture, than the other embodiments described. Their disadvantage is that, because they have fewer prongs, their ability to support heavy objects is reduced.

Although the invention has been described mainly with respect to hardboard, the invention can be used with other materials, and should not be deemed limited to hardboards. The use of the term 'hardboard' is intended to include its equivalents. Also, while the preferred material for the hanging device is metal, it may be possible to form the device of other materials, especially materials not yet available. This invention should not be limited to a particular choice of material.

The invention should also not be deemed limited to a particular shape of the exterior contour of the blank used to form the hanging device. In the embodiments shown, this shape is generally rectangular, but the invention can be practiced with blanks having other shapes.

While the invention has been described with respect to certain illustrated embodiments, it is understood that other variations, such as those mentioned above, are also possible. This invention should not be deemed limited to the embodiments shown, but should be construed to include all such modifications, within the spirit of the following claims.

What is claimed is:

1. A hanging device for a hardboard member, the hanging device comprising a generally flat body, the body having an upper side and a lower side, the upper side including means for suspending the device from a nail, the body having first and second rows of prongs, the first row of prongs being disposed nearer to the upper side of the body, and the second row of prongs being disposed nearer to the lower side of the body, the prongs extending from the body and being non-perpendicular to the body, the prongs being integral with the body, the prongs being generally flat and planar, wherein the prongs of the first row are angled towards the upper side of the body, and the prongs of the second row are angled towards the lower side of the body, wherein the prongs of the first and second rows are angled away from each other in a direction pointing away from the body, and wherein the plane of the prongs intersects the plane of the body along a line which is perpendicular to a line joining the upper and lower sides.

2. The hanging device of claim 1, wherein the suspending means comprises an opening in the body, the opening defining a sawtooth pattern.

3. The hanging device of claim 2, wherein there are a plurality of generally rectangular protrusions superimposed on the sawtooth pattern, the protrusions defining rectangular channels which comprise means for suspending the handing device from a rectangular picture hanger.

4. The hanging device of claim 1, wherein the acute angles between each of the prongs and the body are substantially equal.

5. The hanging device of claim 1, wherein the suspending means comprises an opening in the body, the opening defining an interior edge having a rounded surface.

6. A hanging device for a hardboard member, the hanging device comprising a generally flat body, the body having an upper side and a lower side, the upper side including means for suspending the device from a nail, the body having a plurality of rows of prongs, a first row of prongs being disposed nearer to the upper side of the body, and other rows of prongs being disposed nearer to the lower side of the body, the prongs extending from the body and being non-perpendicular to the body, the prongs being integral with the body, the prongs being generally flat and planar, wherein the prongs of the first row are angled towards the upper side of the body in a direction pointing away from the body, wherein the prongs of each succeeding row, in the direction of the lower side, are angled in the direction opposite to that of the prongs of the preceding row, and wherein the plane of the prongs intersects the plane of the body along a line which is perpendicular to a line joining the upper and lower sides.

7. The hanging device of claim 6, wherein there are three rows of prongs, wherein the prongs of the second row are angled towards the lower side, and wherein the prongs of the third row are angled towards the upper side.

8. The hanging device of claim 6, wherein the suspending means comprises an opening in the body, the opening defining a sawtooth pattern.

9. The hanging device of claim 8, wherein there are a plurality of generally rectangular protrusions superimposed on the sawtooth pattern, the protrusions defining rectangular channels which comprise means for suspending the handing device from a rectangular picture hanger.

10. The hanging device of claim 6, wherein the acture angles between each of the prongs and the body are substantially equal.

11. The hanging device of claim 6, wherein the suspending means comprises an opening in the body, the opening defining an interior edge having a rounded surface.

* * * * *